United States Patent [19]

Sibley

[11] 3,968,045

[45] July 6, 1976

[54] ALKALINITY REDUCTION IN AN ABSORPTION REFRIGERATION SYSTEM

[75] Inventor: Howard W. Sibley, Baldwinsville, N.Y.

[73] Assignee: Carrier Corporation, Syracuse, N.Y.

[22] Filed: Feb. 28, 1975

[21] Appl. No.: 553,956

[52] U.S. Cl. .................................. 252/68; 252/69; 62/112
[51] Int. Cl.² ........................................ C09K 5/00
[58] Field of Search ............ 252/67, 68, 69; 62/112

[56] References Cited
UNITED STATES PATENTS

| 3,316,728 | 5/1967 | Biermann | 252/67 X |
| 3,580,759 | 5/1971 | Albertson | 252/68 X |
| 3,609,086 | 9/1971 | Modahl et al. | 252/68 |

*Primary Examiner*—Harris A. Pitlick
*Attorney, Agent, or Firm*—J. Raymond Curtin; Thomas J. Wall

[57] ABSTRACT

Carbon dioxide gas is bled into an absorption refrigeration system to reduce the alkaline normality of an aqueous lithium bromide solution. The carbon dioxide reacts with lithium hydroxide contained in the solution to form a carbonate thereby reducing the alkaline normality of the solution.

14 Claims, 4 Drawing Figures

ALKALINITY REDUCTION IN AN ABSORPTION REFRIGERATION SYSTEM

BACKGROUND OF THE INVENTION

This invention relates to the reduction of alkaline normality of a lithium bromide solution as commonly employed in an absorption refrigeration system.

Generally, in most absorption systems utilizing lithium bromide as a working fluid, the solution is inhibited to reduce the harmful effects of the solution upon the wetted metal surfaces of the machine. In this type of system, the water in the solution reacts with metals, particularly iron, to form corrosives. In an acid or neutral solution, the corrosive reaction occurs at a relatively rapid rate. In fact, iron corrosion can take place at such a rate that the operating life of the machine could be drastically reduced. Furthermore, non-condensible hydrogen is released within the solution in considerable amounts which can act to interfere with, and thus seriously reduce, the efficiency of the absorptive process.

It is the common practice in the art to add lithium hydroxide to the solution to retard the corrosive effects and thus extend the life of the system. Generally, sufficient lithium hydroxide is added to bring the solution pH to a level of between 11 and 13. However, even with the addition of lithium hydroxide, the rate at which hydrogen is produced within the solution is excessive. To eliminate the hydrogen effect, either lithium chromate or lithium nitrate is added to the solution in sufficient quantities to completely eliminate the hydrogen generated. Thus, in most lithium bromide solutions, lithium hydroxide is added as the primary inhibitor to retard corrosion and either lithium chromate or lithium nitrate added as a secondary inhibitor to control low level corrosion and eliminate hydrogen generation.

It has been found that solutions containing inhibitors exhibit an increase in the hydroxide normality with usage. It is therefore important to periodically reduce or lower the alkalinity of the solution in order to preserve high operating efficiency. One of the most common techniques utilized in lowering alkalinity is the periodic addition of hydrobromic acid to the solution. Because of the volatile nature of the additive, this procedure must be practiced with caution. It also requires exacting procedures to insure that the proper dilution is obtained within the solution. In certain cases, improper addition of hydrobromic acid can affect the solution cation constituents and produce an erratic behavior within the system or results in the production of non-condensible gases which serve to interfere with the absorption process. Similarly, any air leakage into the system during the adjustment period will have a detrimental effect upon the solution. Finally, the commercial availability of hydrobromic acid is extremely limited and expensive.

SUMMARY OF THE INVENTION

It is therefore an object of the present invention to improve lithium bromide absorption systems.

A further object of the present invention is to provide an absorptive solution in which the neutralization behavior is relatively stable and predictable.

Yet another object of the present invention is to provide an absorptive solution containing inhibitors which are readily available and inexpensive.

A still further object of the present invention is to provide a substance for controlling normality in a lithium bromide solution that is safe to handle and which will not react with air to form non-condensible gases in the solution.

These and other objects of the present invention are attained by the periodic addition of carbon dioxide into an aqueous lithium bromide solution in metered amounts to form carbonates to maintain the normality of the solution within a range sufficient to prevent corrosion.

BRIEF DESCRIPTION OF THE DRAWINGS

For a better understanding of the present invention as well as other objects and further features thereof, reference is had to the following detailed description of the invention to be read in connection with the accompanying drawings, wherein.

DESCRIPTION OF THE PREFERRED EMBODIMENT

As noted above, this invention relates to the addition of carbon dioxide to an aqueous lithium bromide solution inhibited with lithium hydroxide as typically employed in refrigeration systems for the purpose of controlling the normality of the solution. The following stoichiometric relationship describes the hydroxide normality reduction that takes place with the addition of carbon dioxide into such a solution:

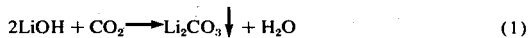

$$2\text{LiOH} + \text{CO}_2 \longrightarrow \text{Li}_2\text{CO}_3\downarrow + \text{H}_2\text{O} \qquad (1)$$

Figure 3:
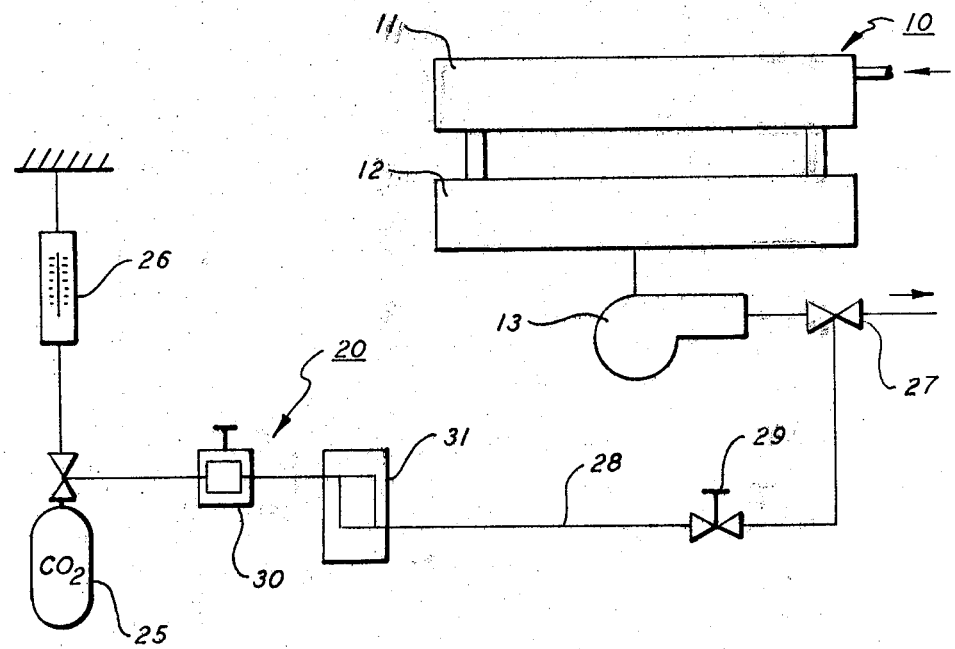
FIG. 3 is a schematic representation of a system for accurately and safely adding carbon dioxide to a refrigeration system employing lithium bromide as a working substance.

To accomplish an alkalinity adjustment of solution normality in a refrigeration system, the apparatus of FIG. 3 can be employed. Generally, an absorption refrigeration system 10 will include at least a generator 11, an absorber 12, and a circulation pump 13. Although not shown, it should be understood that the refrigeration system typically includes other components which are interrelated in a manner well known in the art for completing the cooling cycle. It should be further understood that the working substance employed in the present system is a lithium bromide solution containing a primary inhibitor of lithium hydroxide and can alternatively contain secondary inhibitors conventionally being either lithium chromate or lithium nitrate.

A carbon dioxide adjustment circuit, generally referenced 20, is connected into the refrigeration system at the discharge side of the solution pump via a service valve 27. The connection of the adjustment circuit does not necessarily have to be made at this particular juncture and any convenient location within the cycle can be utilized at which CO₂ gas will readily react with the lithium bromide solution.

As will be explained in further detail below, the quantity and the rate at which the CO₂ gas is introduced into the solution may be regulated to provide an optimum adjustment. A pressurized CO₂ gas cylinder 25 of known weight is suspended from an accurate scale 26 and is operatively connected to the service valve 27 by means of a supply line 28. A manually operated shut-off valve 29 is positioned in the supply line by which the flow of gas to the service valve can be either initiated or terminated. Interposed between the cylinder 25 and the valve 29 is a pressure regulator 30 and a flow meter 31. In operation, the manual valve is opened and the rate of flow through the adjustment circuit is set to a desired level by adjusting the pressure regulator. The flow is allowed to continue until the required quantity (weight) of gas has been depleted from the cylinder. The adjustment is then terminated by simply closing the valve 29.

Figure 1:
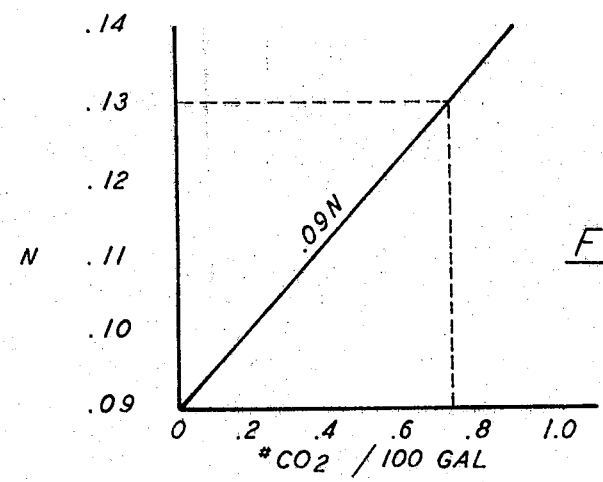
FIG. 1 is a graphic representation of the normality produced in a lithium bromide solution containing a lithium nitrate inhibitor by the addition of carbon dioxide.
Figure 2:
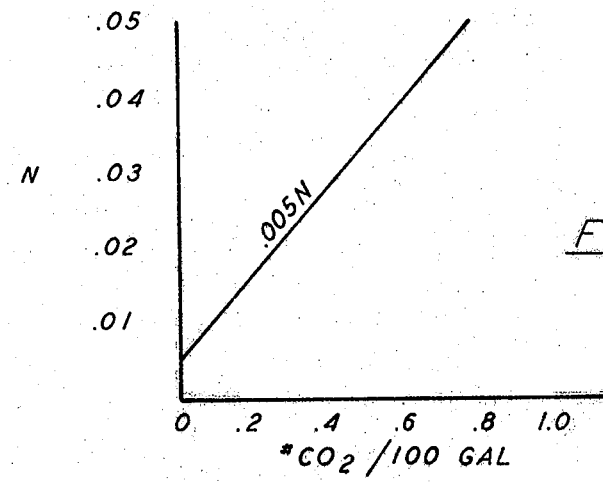
FIG. 2 is a graphic representation of the normality produced in a lithium bromide solution containing a lithium chromate inhibitor by the addition of carbon dioxide.

Through both analytical calculations and test results, curves have been developed by which the amount of carbon dioxide required to adjust the alkaline normalities of a given solution can be accurately determined. Two such curves are shown plotted in FIGS. 1 and 2. Both of these curves relate to a typical 54% lithium bromide solution containing a primary inhibitor of lithium hydroxide in an amount of approximately 0.2% by weight. The curve depicted in FIG. 1 is for a solution further containing a secondary inhibitor being lithium nitrate, while the curve illustrated in FIG. 2 is for a solution containing a secondary inhibitor being lithium chromate. In the case of a solution containing lithium nitrate, an alkaline normality of about 0.09N is preferred to insure that the optimum solution characteristics will be maintained. Similarly, in a solution containing lithium chromate, a preferred normality of about 0.005N is preferred.

Referring specifically to the curves, the phenolphthalein alkaline normality of the solution is plotted along the ordinate in equivalence per liter. The pounds of CO₂ required for each 100 gallons of solution in the refrigeration system needed to bring the solution into the desired normality range is plotted along the abscissa.

In practice, the normality of the solution within the refrigeration system is determined by first filtering a sample of the solution through a vinyl or a polypropylene filter having three micron openings therein and then titrating the filtration to its phenolphthalein end point using a 0.1N acid. When the test sample indicates that the alkalinity of the system is relatively high, the appropriate graph is referred to and a direct reading of the required amount of CO₂ needed to adjust the system into the desired range obtained. For example, if the test sample for a solution inhibited with lithium nitrate indicates that the solution alkalinity is 0.13N, a reading from the graph shown in FIG. 1 is taken along the dotted line indicating that an addition of 0.7 pounds of CO₂ is required for each 100 gallons of solution in the system in order to bring the alkalinity level to the desired 0.09N.

Test results have further shown that excessive CO₂ flow rates during the adjustment period can result in an incomplete reaction whereby free CO₂ gas is lost from the solution, the free gas being collected within vapor pockets or chambers normally found in refrigeration systems. The rate of the reaction may be estimated by the equation:

$$\frac{dx}{dt} = 5.15(10^{-4})(R)^{.322}\left(\frac{50}{V_s}\right) \qquad (2)$$

where:
$x$ is the normality in eq/e,
$t$ is time in minutes,
$V_s$ is the volume of solution in gal., and
$R$ is the CO₂ flow rate in ft.3/hr.

Figure 4:
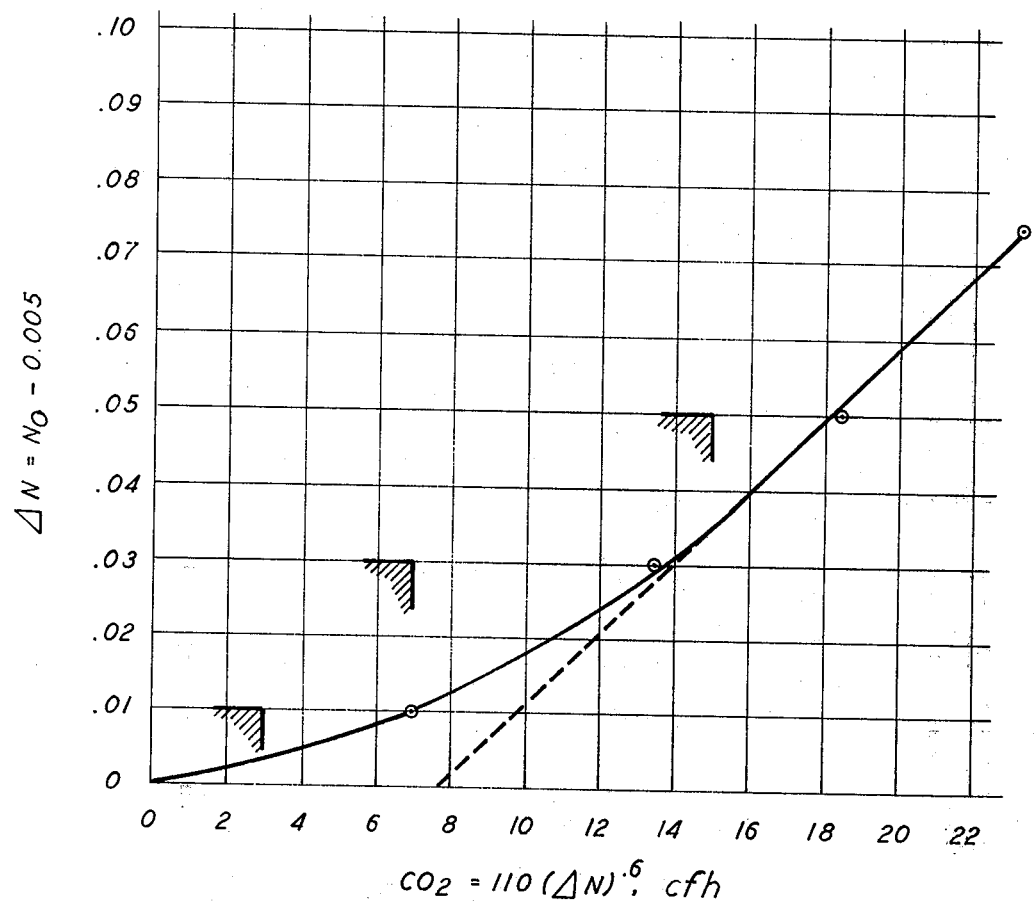
FIG. 4 is a graphic representation of the relationship between the reaction rate of carbon dioxide and differential alkalinity.

It has further been found that the expediential relationship between the reaction rate and the differential alkalinity of the solution further affects the flow rate. That is to say, as the normality of the solution approaches the optimum range, the reaction rate of the CO₂ gas decreases thus requiring a decrease in the CO₂ flow rate in order to avoid unwanted losses. From the data developed, a plot was generated indicating optimum flows in the low differential ranges. This plot is illustrated in FIG. 4. From this plot, a flow rate schedule can be established whereby nuisance losses of CO₂ gas within the system are minimized. The schedule is as follows:

| Alkalinity Level | CO₂ (CFH) |
|---|---|
| 0.15 – 0.05 | ≤ 25 |
| 0.05 – 0.03 | ≤ 15 |
| 0.03 – 0.005 | ≤ 7 |

The lithium carbonate (Li₂CO₃) formed by the reaction of CO₂ in the solution is essentially insoluble in a lithium bromide solution. Accordingly, the lithium carbonate forms a precipitate within the solution. Tests have shown that the precipitate is in the form of 10 to 15 micron particles. The small particles do not agglomerate within the solution and remain therein as a finely dispersed suspension. The lithium carbonate can be easily removed from the solution by any standard filtration practice known and used in the art during alkalinity reduction. Laboratory tests show that the lithium carbonate will not scale or otherwise foul heat transfer surfaces and piping within the refrigeration system when found in the quantities formed during alkalinity reduction.

As CO₂ is bled into the alkaline solution, it is possible to exceed the stoichiometric amount required to produce the necessary hydroxide ion reduction. Upon the occurrence of such a situation, the solution alkalinity drops to zero and, as an excess of CO₂ continues to be bled into the system, the gas reacts with water as follows:

$$CO_2 + H_2O \rightleftarrows H_2CO_3 \qquad (3)$$

$$H_2CO_3 \rightleftarrows H^+ + HCO_3^- \qquad (4)$$

$$HCO_3^- \rightleftarrows H^+ + CO_3^- \qquad (5)$$

The free hydrogen ion reacts with LiCO₃ formed during the adjustment according to:

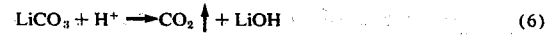
$$LiCO_3 + H^+ \rightarrow CO_2 \uparrow + LiOH \qquad (6)$$

which, in turn, brings the solution back to a neutral condition. Any excessive CO₂ gas remaining after the buffering action is completed can be purged from the system.

As can be seen, in other neutralization processes requiring the addition of acids, any excess acid introduced into the solution can cause serious structural damage to the machine components. However, in the present $CO_2$ system, the system is self-compensating due to the buffering action and poses no danger to the machine components.

EXAMPLE 1

An alkalinity adjustment in accordance with the $CO_2$ procedures outlined above was conducted on 200 gallons of a 54% lithium bromide solution inhibited with approximately 0.2% by weight lithium hydroxide and a secondary inhibitor of lithium chromate whereby the solution had an alkaline normality of 0.03N by bleeding $CO_2$ into the solution at a flow rate of 7 cubic feet per hour until 0.86 pounds of $CO_2$ had been introduced into the system. The corrected solution alkalinity was sampled and found to have a desired normality of 0.005N.

EXAMPLE 2

An alkalinity adjustment as outlined above was made on 400 gallons of a 54% solution of lithium bromide containing 0.2% by weight lithium hydroxide and a secondary inhibitor of lithium nitrate whereby the solution had an alkaline normality of 0.138N by bleeding $CO_2$ into the solution at a flow rate of 25 cubic feet per hour until 3.32 pounds of $CO_2$ had been introduced therein. The corrected solution alkalinity was sampled and found to have a hydroxide normality of 0.09N.

EXAMPLE 3

An alkalinity adjustment was made on 150 gallons of a 54% lithium bromide solution containing 0.2% by weight lithium hydroxide and a secondary inhibitor of lithium chromate whereby the solution had an alkaline normality of 0.066N by bleeding $CO_2$ into the solution at a flow rate of 15 cubic feet per hour until its normality dropped below 0.05N and then the flow rate was lowered to 7 cubic feet per hour until 1.59 pounds of $CO_2$ had been introduced therein. The corrected solution alkalinity was tested and found to have a hydroxide normality of 0.005N.

EXAMPLE 4

An absorption refrigeration machine having 600 gallons of a 54% lithium bromide solution containing 0.2% by weight lithium hydroxide and being inhibited with lithium chromate at an alkaline normality of 0.1N was treated with an excess of $CO_2$. It was determined that an addition of 102 pounds of $CO_2$ would be needed to reduce the normality down to 0.005N. An excess of 10 pounds of $CO_2$ was bled into the system resulting in unreacted $CO_2$ being present in the solution. The excess caused the solution to temporarily become acidic due to the formation of carbonic acid and changing the yellow chromate ion to the orange dichromate ion. However, the ionization potential of the acid was such as to permit the hydrogen ion to react with the lithium carbonate to form free $CO_2$ and lithium hydroxide. As a result, the solution self-corrected to bring the normality back to the desired level and the orange dichromate ion reverted back to the more desirable yellow chromate ion.

What is claimed is:

1. The method of reducing the alkaline normality of a lithium bromide solution containing lithium hydroxide including the steps of
    introducing carbon dioxide into the solution whereby the carbon dioxide reacts with lithium hydroxide to adjust the normality of the solution,
    metering the flow rate of the carbon dioxide as it is introduced into the solution whereby the reaction rate is regulated to minimize loss of free carbon dioxide from the solution, and
    controlling the amount of carbon dioxide introduced into the solution to bring the normality of the solution to a predetermined range.
2. The method of claim 1 further including the step of periodically sampling the solution during normality reduction to determine the normality of the solution.
3. The method of claim 2 wherein the solution is sampled by
    filtering the solution through a non-cellulosic material having approximately three micron openings, and
    titrating the filtered solution to the phenolphthalein end point with an acid.
4. The method of claim 2 wherein the flow rate is metered according to the following schedule to bring the alkalinity level to a predetermined end point:

| Alkalinity Level | $CO_2$ [(CFH)] (Cubic Feet/Hour) |
| --- | --- |
| >0.05 | ≤ 25 |
| 0.05 – 0.03 | ≤ 15 |
| 0.03 – 0.005 | ≤ 7 |

5. An absorbent solution for a refrigeration system comprising an aqueous solution containing lithium bromide, a primary inhibitor of lithium hydroxide and a carbonate formed by a reaction of carbon dioxide with the primary inhibitor to maintain the normality of the solution at a predetermined level.
6. An absorbent solution of claim 5 wherein the concentration of the lithium bromide is approximately 54% by weight and the primary inhibitor is approximately 0.2% by weight.
7. An absorbent solution of claim 5 further including a secondary inhibitor of lithium nitrate and the normality of the solution being maintained at about 0.09N.
8. An absorbent solution of claim 5 further including a secondary inhibitor of lithium chromate and the normality of the solution being maintained at about 0.005N.
9. An absorbent solution of claim 5 wherein the carbonate in the solution forms a precipitate having a 10 to 15 micron particle size.
10. A solution for use in an absorptive refrigeration system having an alkaline normality within a predetermined range such that the corrosive effect of the solution upon the wetted surfaces of the system are minimized, said solution formed by the process including
    introducing carbon dioxide into a lithium bromide solution inhibited with lithium hydroxide,
    periodically sampling said solution to determine its normality, and
    terminating said first-mentioned step when said normality is at a predetermined level.
11. The solution of claim 10 wherein the solution formed by the process contains carbonates having a particular size of between 10 and 15 microns.

12. The solution of claim 10 wherein the lithium bromide solution contains a second inhibitor comprising lithium nitrate and the introduction step is terminated when the normality of the solution is at about 0.09N.

13. The solution of claim 10 wherein the lithium bromide solution contains a second inhibitor comprising lithium chromate and the introduction step is terminated when the normality of the solution is at about 0.005N.

14. A solution for use in an absorption refrigeration machine having an alkaline normality within a predetermined range wherein corrosion upon the wetted surfaces of the machine is minimized, said solution being formed by the process including
  introducing carbon dioxide into a lithium bromide solution inhibited with lithium hydroxide,
  controlling the flow rate at which carbon dioxide is introduced into the lithium bromide solution in relation to the reaction rate of the carbon dioxide and lithium hydroxide whereby free carbon dioxide is prevented from leaving the solution, and
  regulating the amount of carbon dioxide introduced into said solution whereby the alkaline normality is reduced to a predetermined level.

* * * * *